C. JOBST.
BRUSH MAKING MACHINE.
APPLICATION FILED NOV. 24, 1913.

1,144,711.

Patented June 29, 1915.
6 SHEETS—SHEET 1.

Fig. 1.

WITNESSES:

INVENTOR.
Conrad Jobst.
By Owen, Owen & Crampton,
His attys.

C. JOBST.
BRUSH MAKING MACHINE.
APPLICATION FILED NOV. 24, 1913.

1,144,711.

Patented June 29, 1915.
6 SHEETS—SHEET 4.

WITNESSES:

INVENTOR.
Conrad Jobst.
By Owen, Owen & Crampton,
His attys.

C. JOBST.
BRUSH MAKING MACHINE.
APPLICATION FILED NOV. 24, 1913.

1,144,711.

Patented June 29, 1915.
6 SHEETS—SHEET 6.

WITNESSES:

INVENTOR.
Conrad Jobst.

UNITED STATES PATENT OFFICE.

CONRAD JOBST, OF TOLEDO, OHIO, ASSIGNOR TO THE AMES BONNER COMPANY, OF TOLEDO, OHIO, A CORPORATION OF MICHIGAN.

BRUSH-MAKING MACHINE.

1,144,711.  Specification of Letters Patent.  Patented June 29, 1915.

Application filed November 24, 1913. Serial No. 802,682.

*To all whom it may concern:*

Be it known that I, CONRAD JOBST, a citizen of Germany, and a resident of Toledo, in the county of Lucas and State of Ohio, United States of America, have invented a certain new and useful Brush-Making Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to brush-making machines, and particularly to machines of this class of the compound type, or those adapted to both drill and fill brush backs.

An object of my invention is the provision, in a machine of the class described, of improved and effective means for directing and controlling the movements of a brush-back carrying part as the drilling or filling operation progresses, whereby the positioning of the holes or the placing of the bristle-tufts therein is accurately and positively controlled.

A further object of the invention is the provision of simple and efficient means for moving a brush-back toward and away from a swinging axis to compensate for the varying distances between such axis and different points on a brush-back, whereby a boring of holes or an anchoring of bristle-tufts of uniform depth therein is accomplished.

A further object of the invention is the provision of means which not only accurately accomplishes a boring of holes of uniform depth and a uniform anchoring of bristle-tufts therein, but which also provides a firm-anvil or abutment for acting against the brush-back carrying member to oppose each boring or bristle-tuft setting operation, thus improving on the action of machines of this class.

A further object of my invention is the provision of an improved mechanism having a plurality of separate work carrying parts which are operable to have corresponding compound oscillatory movements in unison to repeatedly place work carried thereby in different predetermined positions to be operated on.

A further object of the invention is the provision of simple and efficient means which, during a running of the machine, is automatically operable to intermittently lock and release the pattern-wheels to hold them rigid during the drilling and filling operations or either.

Further objects and advantages will be apparent by reference to the following detailed description.

The invention is fully described in the following specification, and while, in its broader aspect, it is capable of embodiment in numerous forms, a preferred embodiment thereof is illustrated in the accompanying drawings, in which,—

Figure 1 is a left side elevation of a machine embodying the invention.

Figure 4:
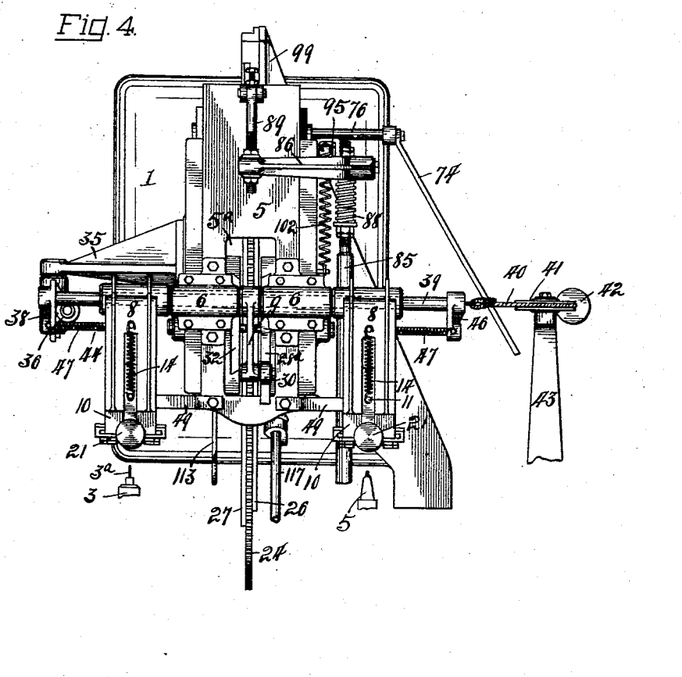
Fig. 4 is a top plan view thereof with parts broken away.
Figure 5:
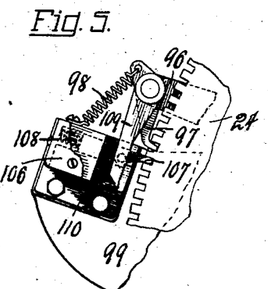
Figs. 5, 6 and 6$^A$ are details of the master wheel locking mechanism and parts thereof.
Figure 6:
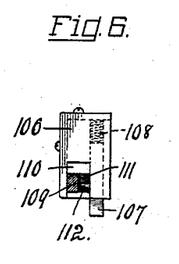
Figure 6A:
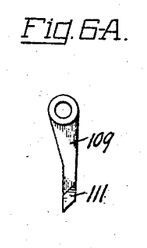

Referring to the drawings, 1 designates the portion of the machine frame which carries the parts and mechanisms embodying the features of my invention and which is shown as being substantially U-shape, and 2 the frame part which is disposed in front of the part 1 at one side thereof and has the table part 2$^a$ extending laterally from the left side of its top, said part 2—2$^a$ carrying the drilling and filler mechanisms of the machine, both of which mechanisms are commonly used in machines of this class and which, in themselves, contain no patentable features. Of these mechanisms, 3 designates a head or chuck for carrying a drill 3ª, and 4 the filler nozzle, such drill head and nozzle, in the present instance, being horizontally spaced, as best shown in Fig. 4.

Mounted for forward and backward movements on the top of the frame 1 over the crotch or open portion thereof is a table 5, which is provided near its forward end with an elongated longitudinally-extending opening 5ª and has its side edges working in suitable guide-ways in the frame sides. Bearings 6, 6 are fixedly carried by the table 5 at opposite sides of the opening 5ª with their shaft receiving openings in axial register, and journaled in these for free rocking movements is a hollow shaft 7, which extends transversely of the frame and preferably stands in substantially the horizontal plane of the drill-head 3 and filler 4. The shaft 7, at each end thereof without the bearings 6, 6 fixedly carries a forwardly-projecting U-shaped rocker-head or yoke member 8, and from the portion of the shaft intermediate the bearings 6, 6 forwardly projects an arm 9. The shaft 7 and parts 8 and 9 are preferably cast in a single piece, but may be formed in any other suitable manner as desired.

Each rocker-head or yoke member 8 has the inner sides of its legs in spaced parallel relation, and mounted therebetween is a brush-back carrying-frame 10, which has its upper and lower sides parallel to the inner sides of the yoke legs and loosely mounted therebetween for horizontal swinging and longitudinal sliding movements relative thereto. A pivot-stud 11 projects upward and downward from the respective upper and lower sides of each frame 10, preferably near the front or outer end thereof, and into an associated bearing-block or bar 12, which is of elongated form and mounted for reciprocatory movements in a longitudinally-disposed slot 13 in the adjacent rocker-head leg. It is thus evident that the frame 10 is permitted to have forward and backward sliding movements relative to the rocker-head 8 by which it is carried, and also to horizontally turn at any point of such movement with the studs 11 as its axis. A coiled compression spring 14 connects the outer end of each pivot stud 11 with a stud 15 or other fixed part on the inner end portion of the respective leg of the associated rocker-head and serves to urge the frame 10 inward toward the inner or closed end of the rocker-head.

The front or outer end of each frame 10 is provided at its inner side with a thrust plate 16, the purpose of which will be hereinafter more fully described, and at the outer side of such plate it carries a pair of brush-back clamping blocks 17—17 which are disposed in superimposed relation, and have their side edges slidingly embracing vertical guide ribs 18 on the frame 10 to permit the blocks to have relative reciprocatory movements. Each block has a set of gripping fingers 19 for engaging different portions of a brush-back 20, and the relative brush-back clamping or releasing movements of such blocks are caused by a turning in one direction or the other of a hand control screw 21, which projects down at the rear of the blocks and has different portions in right and left threaded engagement with registering portions of the respective blocks, as shown at 22 in Fig. 7. The stem of the screw 21 has bearings in the upper and lower front edge portions of the frame 10, as at 23, and is anchored in any suitable manner against longitudinal movements relative to the frame.

A master-wheel 24 is loosely mounted within the opening of the frame part 1 on a shaft 25 therein, and fixed to the opposite sides thereof are the pattern cam-wheels 26 and 27, the former of which determines the vertical tilting or oscillatory movements of the shaft 7 and fixedly attached rocker-heads or yoke members 8, 8, while the latter determines the horizontal swinging movements of the frames 10, 10, relative to the yoke members. Coöperating with the cam-wheel 26 to control the rocking movements of the shaft 7 is a slide 28, which is suitably mounted within the frame part 1 for vertical reciprocatory movements over the shaft 25 and at the side of the cam wheel 26 and carries a stud or roll 29 at one side thereof for riding upon the periphery of the cam wheel 26, whereby reciprocatory movements are imparted to the slide in accordance with the cam formation of the wheel periphery. The slide 28 is provided at its upper end with a head portion 28ª, the top side of which forms a horizontally-elongated surface upon which rides a roll 30 that is carried by the arm 9 at one side of its free end. It is thus evident that the vertical movements of the slide 28 will communicate predetermined rocking movements to the shaft 7 and the parts carried thereby.

The cam periphery of the pattern wheel 27 coacts with a roll or stud 31 which projects from the side of a vertically movable slide member 32 and rides on said wheel at the top side thereof. (See Fig. 2.) The slide member 32 is suitably guided for vertical reciprocatory movements by the frame 1 and has a finger 33 projecting from a side thereof in opposition to the wheel 27. A bell crank lever 34 is fulcrumed for vertical rocking movements to a bracket-arm 35 projecting from the left side of the frame 1, and this lever has one arm projecting upwardly and carrying, in the present instance, an anti-friction roll 36 and its other arm projecting horizontally with the free end portion thereof extending into a vertically-disposed slot or opening 37 in the frame side and resting upon the slide-member finger 33. The roll 36 on the vertical arm on the lever 34 bears outwardly against a plate 38, which is carried at the adjacent end of an axially shiftable shaft 39, which shaft extends loosely through the hollow of the shaft 7. The shaft 39 is yieldingly urged to cause the plate 38 to constantly bear inward against the lever roll 36 by the attaching of a weighted cable 40 to the opposite end of the shaft, which cable passes outwardly from the shaft end over a sheave 41 and carries a weight 42 at its free or loose end, or such urging action may be accomplished in any other suitable or convenient manner. The sheave 41 is shown as being carried by an arm 43 projecting rearwardly from the adjacent side portion of the frame part 2.

A thrust-rod or finger 44 is carried by the shaft 39 at each end thereof in substantial parallelism therewith, one rod projecting inwardly from the upper portion of the plate 38 and preferably having a pin point bearing against the inner end of the adjacent brush-back carrying frame 10 within a bearing depression 45 therein, as best shown in Figs. 7 to 11, while the other rod or finger 44 projects inwardly from an arm 46 on the shaft 39 and has its free end in similar pin-point bearing against the inner end of the adjacent frame 10. A coiled contractile spring 47 connects the inner end of each frame 10 to the adjacent part 38, 46 and serves to yieldingly retain the respective frame end and thrust rod 39 in bearing contact. The rods or fingers 44, 44 are carried for limited pivotal movements by the parts 38, 46 to permit the frames 10 to have sliding movements relative to the rocker heads 8, 8. It is thus evident that an axial movement of the shaft 39 in one direction will cause one of the thrust fingers 44 to push against the associated frame 10 and the spring 47 at the opposite end of the shaft 39 to have a pulling action on the other frame 10 to swing the frames in unison, and that a movement of the shaft 39 in the opposite direction will cause the other of said thrust fingers 44 and springs 47 to act against the respective frames to swing the same in the opposite direction relative to the carrying heads or yoke members 8. The connection between the shaft 39 and frames 10, 10 is such that when the shaft is in what may be termed neutral position, the frames 10, 10 will stand in straight ahead position relative to the frame and when the shaft is moved in either direction from neutral position the frames will be caused to have corresponding swinging movements in unison.

Projecting outwardly from each side of the forward end portion of the table 5 is an arm 49, which projects within the forward end portion of the adjacent brush-back carrying frame 10 and has a finger 50 projecting forward from its free end and in constant end-thrust contact with the thrust plate 16 of the frame 10, such plate being yieldingly held thereagainst by the action of the springs 14. The finger 50, in the present instance, is adjustably secured to the arm 49 by a set-screw 51 and is provided at its forward end with an anti-friction roll 52 for rolling contact with a cam surface 53 on the rear side of the plate 16.

Figures 7, 8, 9, 10, 11, 12, 13, 14:
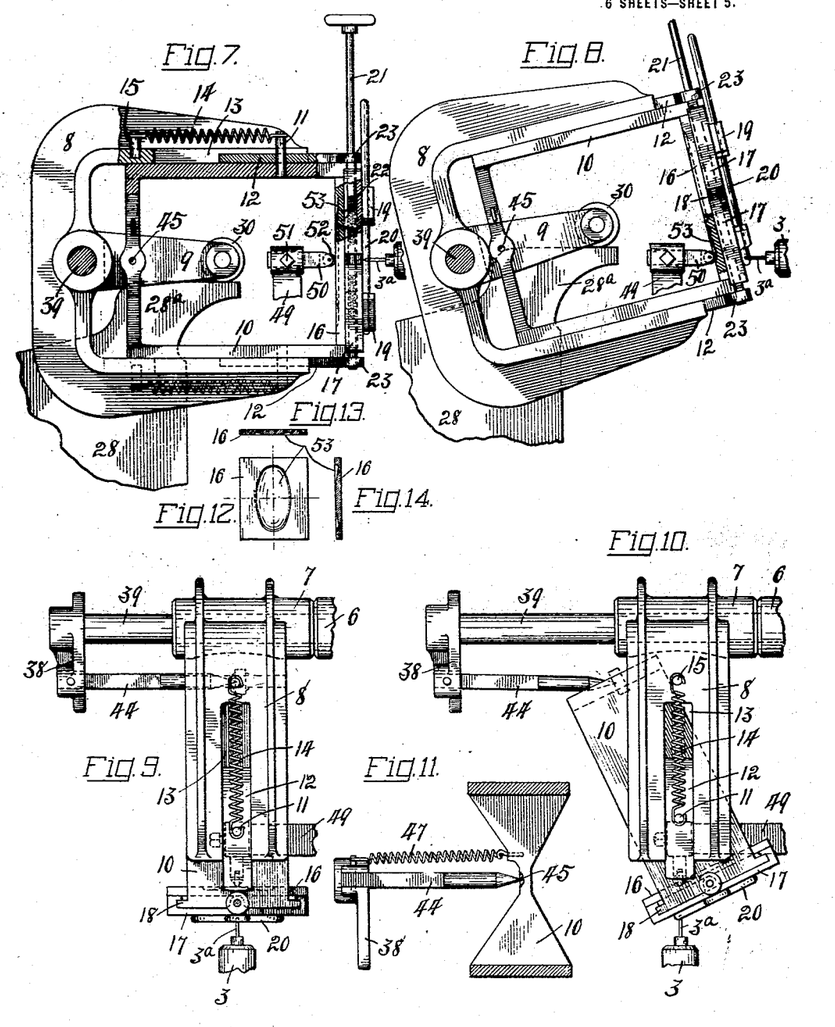
Figs. 7 and 8 are enlarged side elevations of the brush-back carrying mechanisms, with parts broken away and with the mechanism in Fig. 8 tilted from horizontal position.
Figs. 9 and 10 are top plan views of such mechanisms and associated parts with the brush-carrying member thereof in different positions of its horizontal swinging movements.
Fig. 11 is a sectional detail of a portion of the brush-carrying member of said mechanism and associated control parts.
Figs. 12, 13 and 14 are face and different sectional views of the cam thrust plate of said mechanism.
Figure 15:
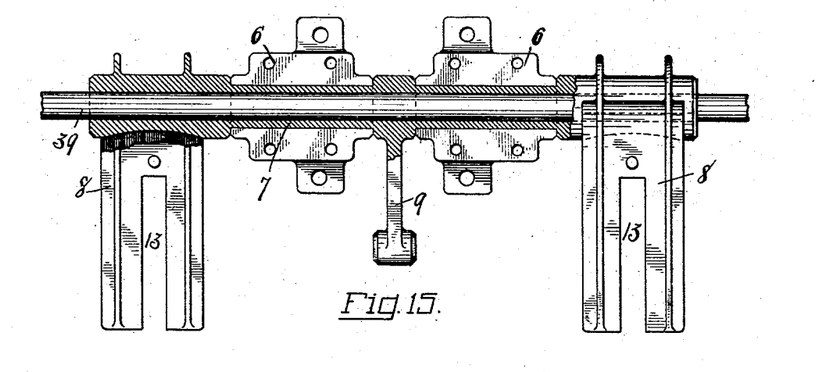
Fig. 15 is an enlarged sectional detail of portions of said mechanism.
Figure 16:
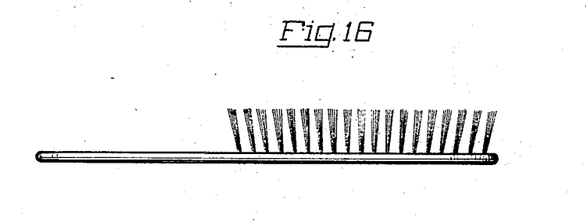
Fig. 16 is an edge view of a brush after having its bristle-tufts set in position by the machine.

The fingers 50 are intended to bear against the respective plates 16, 16 in direct opposition to the drill head 3 and filler 4, as the case may be, and to serve as an anvil or firm abutment for resisting the rearward pressure which is exerted on an associated brush-back during the respective drilling and filling operations. Inasmuch as the axis of the shaft 7 and the anvil or abutment members 49—50 are in constant spaced relation during an operation of the machine, a vertical swinging of the rocker-heads 8 and frames 10 from horizontal positions will permit the frames 10 to move inward under the influence of the springs 14 a sufficient distance to compensate for the difference in the lengths of the radii between the swinging axis of the rocker-heads 8, 8 and different points on the surface of the brush-back at which the drilling or filling operation occurs, thus placing each point of a brush-back, as it moves into register with the drill or filler, in proper relation thereto for the drilling or filling operation. In other words, the distance between the swinging axis of a rocker-head 8 and the lower or upper edges of a brush-back, when the rocker-head is in the horizontal position shown in Fig. 7, is greater than the distance between such axis and the center of the brush-back, and in order to shorten the distance of such long radii when the upper or lower edges are swung to drilling or filling position the co-action of the cam face of the plate 16 with the anvil roll 52 permits the frame 10 to move inward under the influence of the springs 14 a sufficient distance to compensate for the difference in length of the radii, as shown by the position of the parts in Fig. 8.

The purpose of the cam surface 53 on each plate 16 is to coöperate with the anvil roll 52 to gage the depth of the drilling and filling movements of the drill and filler, respectively, when the brush-back carrying parts are tilted from horizontal position, or the frame 10 is swung from its straight ahead position so that the depth of the holes which are drilled in a brush-back, and the depth of anchoring of the bristle tufts therein, will be uniform throughout the area of the brush-back. The difference in the depth of the holes and the depth of the anchoring of the bristle tufts in a brush-back which would occur if the cam-surface 53 were omitted from the plates 16 is due to the drilling and filling of marginally disposed holes of a brush-back in an outwardly inclining manner, the degree of the incline gradually increasing from near the central portion of a brush-back to the edges thereof, the incline of the holes of the outer row of holes of a back being indicated by the relative positions of the brush-back and drill in Figs. 8 and 10.

54 designates the main drive-shaft of the machine. This shaft is journaled in the frame part 2 transversely thereof and, in the present instance, carries at its outer end a loose belt-pulley 55 and an axially movable clutch member 56, which is feathered to the shaft and has yielding conical frictional engagement with the pulley 55 to cause a yielding driving of the shaft from such pulley. A shipper-lever 57 is fulcrumed to the frame part 2, as at 58, and has a part in shifting engagement with the hub portion of the clutch member 56. The free end of this lever is connected by a link 59 to a crank-arm 60 on a shaft 61, which is journaled in the frame part 2 transversely of the shaft 54 and has an arm 62 projecting horizontally therefrom and attached to a vertically-disposed treadle-rod 63. This rod is guided for reciprocatory movements and has its lower end provided with a foot-pressure receiving part 64. A coiled contractile spring 65 connects an ear 66 on the rod 63 to a fixed part of the frame, as at 67, and coöperates with such rod, the bell-crank lever 60—61—62 and lever 57 to normally hold the clutch member 56 out of clutch engagement with the pulley 55.

Figure 1:
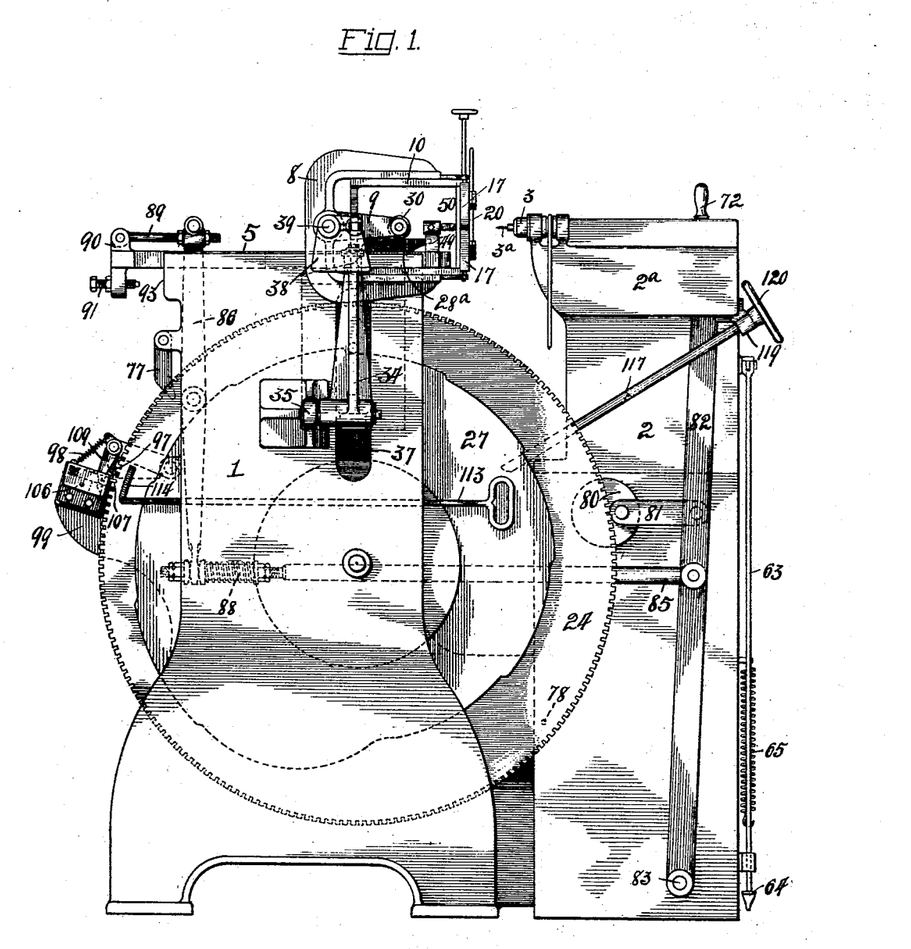
Figure 2:
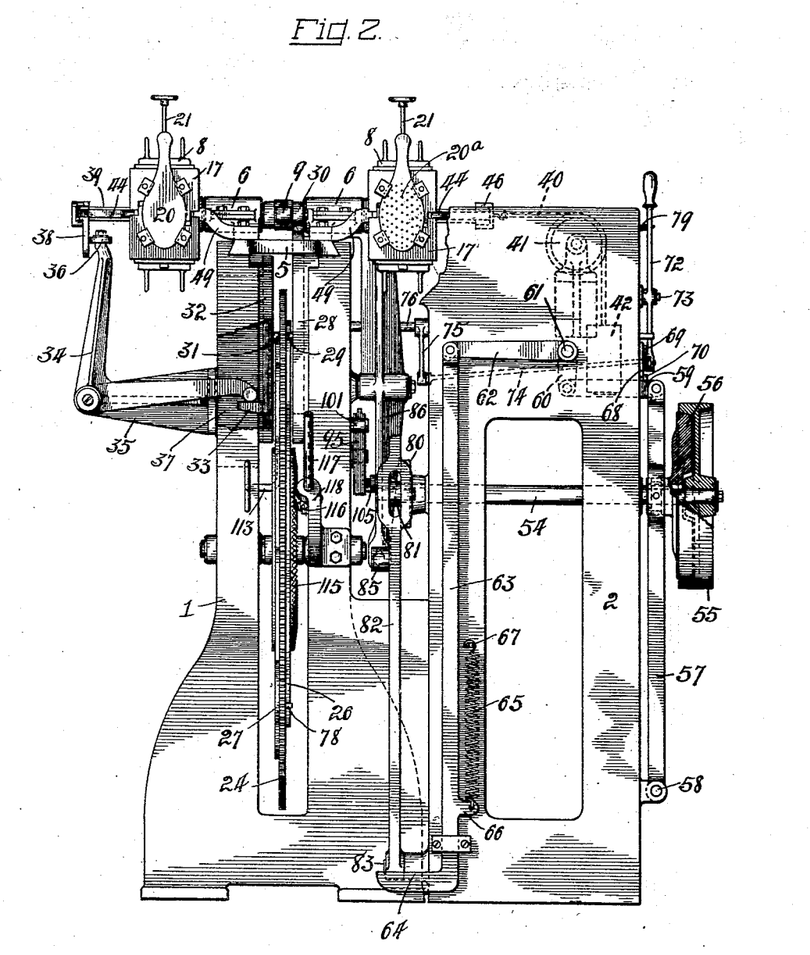
Fig. 2 is a front elevation thereof with parts broken away, and with the drilling, filler and other parts removed.
Figure 3:
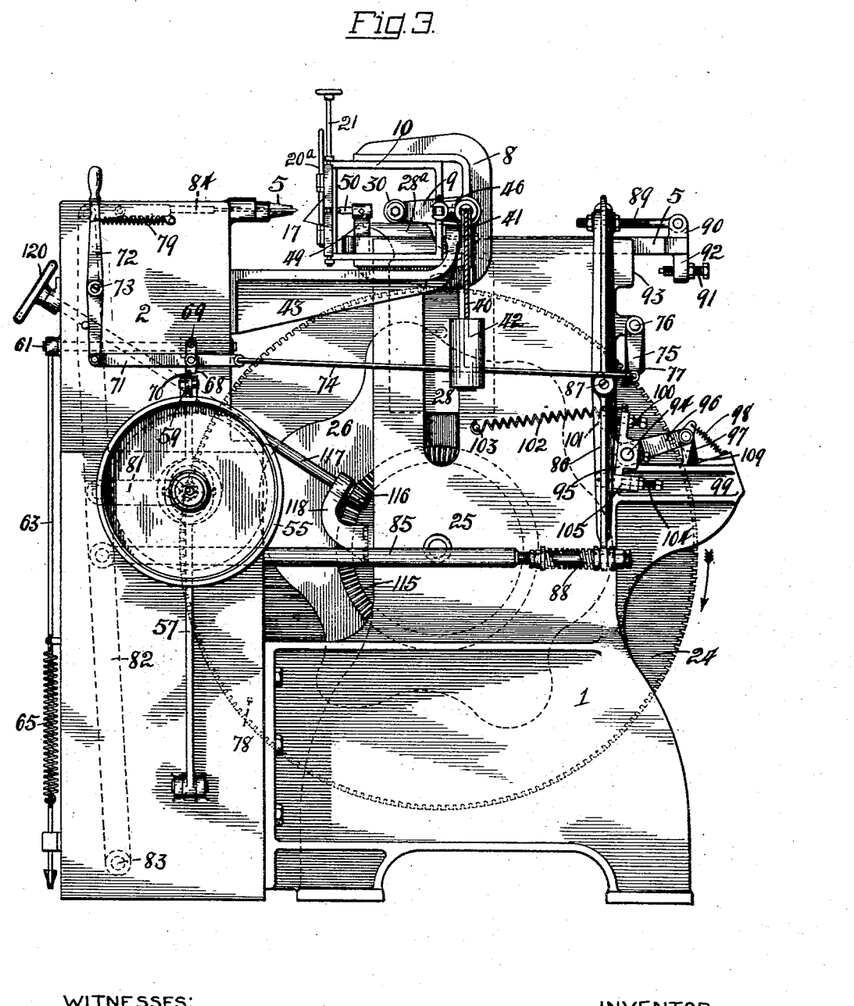
Fig. 3 is a right side elevation of the machine.

The clutch member 56 is retained in engagement with its member 55 against the tension of the spring 65 by the engagement of a catch-finger 68, which is pivoted to the frame part 2, as at 69, with a pin or lug 70 projecting upward from the link 59, as shown in Figs. 2 and 3. A horizontally-disposed bar 71 is pivotally connected to the catch-finger 68 and has one end pivoted to a hand-control lever 72 that is fulcrumed to the frame 2, as at 73, and has its free end connected to a rod 74, which in turn connects at its other end to an arm 75 on a rock-shaft 76. The rock-shaft 76 is journaled in suitable bearings at the rear side of the frame part 1 and has an arm 77 depending therefrom in position for its lower end to be engaged at each revolution of the wheel 24 by a pin 78 on one side of such wheel adjacent to the periphery thereof, whereby to rock such arm. The rocking of the arm 77 by the engagement therewith of the pin 78 effects an automatic tripping of the finger 68 from engagement with the pin 70, thus permitting the clutch member 56 to move outward from its companion under the influence of the spring 65. A spring 79 connects the hand-control lever 72 to a part of the frame 2 and urges such lever in a direction to normally retain the catch-finger 68 in pin engaging position.

The shaft 54 at its inner end carries a crank-wheel 80, the crank-pin of which is connected by a link 81 to a vertically-disposed lever-member 82, which is pivoted at its lower end to the frame 2, as at 83, and has its upper end connected to the plunger 84 of the filler mechanism to actuate the same, as is well understood in the art. A rod 85 connects the member 82 and the lower end of a vertically-disposed lever 86, which is fulcrumed, as at 87, to the rear side portion of the frame part 1. The connection between the rod 85 and lever 86 is cushioned, as shown at 88, to permit a yielding of the lever relative to the rod when the rod has a rearward movement. The upper end of the lever 86 is connected by a link member 89 to a lug 90, fixedly rising from the slide table 5, whereby reciprocatory movements are imparted to the table from rocking movements of the lever. A stop-screw 91 is adjustably carried by a lug 92 on the lower rear end portion of the table 5 and coacts with a registering part 93 of the frame 1 to limit the forward movements of the table to gage the depth of boring of the holes in the brush-backs. If there is any rearward movement of the rod 85 after the screws 91 strike the part 93, it is compensated for by the yielding connection 88.

94 designates a short shaft, which is journaled transversely of the frame 1 in a boss at the rear side of the frame adjacent to the lower arm of the lever 86 and fixedly carries a cross-arm or lever 95 at the end thereof adjacent to the lever 86, and a rock-arm 96 at the other end thereof adjacent to the master-wheel 24. A pawl 97 is carried by the free end of the arm 96 for engaging at its nose end with the teeth of the master-wheel to impart intermittent rotation to the ratchet-wheel in the direction indicated by the arrow in Fig. 3 when the arm 96 is rocked. The nose of the pawl is urged into engagement with the teeth by a spring 98, which connects a tail-piece on the pawl to a bracket or frame part 99 projecting rearwardly from the portion of the frame 1 to which the shaft 94 is journaled. The pawl is adapted to pass over the ratchet-wheel teeth on a raising movement of the arm 96 and to have driving engagement therewith on a lowering movement of such arm.

A stop-screw 100 is adjustably carried by the upper end of the cross-arm or lever 95 and coacts with a registering lug on the frame 1 to limit the rocking movements of the lever 95 in one direction. A coiled contractile spring 102 connects the upper end of the lever 95 to the frame 1, as at 103, and urges such end of the lever toward the stop-lug. The other end portion of the lever 95 is engaged by an adjustable screw or thrust part 104, which is carried by an angled or L-finger 105 projecting from the lower end portion of the lever 86. It will be understood that upon a rearward swinging of the lower end of the lever 86 the spring 102 urges the lever 95 to move therewith until the movement of the latter is stopped by contact of the screw 100 with the stop 101, thus raising the pawl 97 relative to the ratchet-wheel, and that upon a forward movement of the lower end of the lever 86 the thrust part 104—105 acts against the lower end of the lever 95 to communicate a positive ratchet-wheel turning movement to the pawl 97. An adjusting of the screws 100 and 104 relative to the lever 95 will permit the pawl to have a stroke of greater or less length, as it may be desired to move the ratchet-wheel a distance equal to one or more teeth at each impulse.

Carried by the bracket 99 at one side thereof at the rear of the ratchet-wheel 24 is a box or housing 106 in which a wheel locking detent 107 is mounted for reciprocatory movements in a radial direction relative to the wheel. A spring 108 acts to urge the nose end of the detent into a registering periphery recess of the wheel. A trip-finger 109 hangs from the pivot of the pawl for free movements relative thereto and has its free end working down through an opening 110 in the box 106 at one side of the detent, and is provided on the side thereof adjacent to said detent with a lip or projection 111 having correspondingly inclined upper and lower sides. A stud or pin 112 projects from the side of the detent 107 in register with the lip 111, and such lip, upon a downward movement of the finger 109, coacts with the pin to force the detent 107 rearward from wheel locking position, and, upon an upward movement of said finger, coacts with said pin to swing the finger rearward to permit it to rise without disturbing the locking position of the detent. It is thus evident that the detent 107 remains in locking engagement with the wheel 24 to prevent a movement of the same in either direction except during the down or wheel moving stroke of the pawl 97.

113 designates a push-rod which extends rearward through a guide opening in the left side portion of the frame 1, and has its rear end provided with a finger 114 which extends upward in advance of the pawl 97 and detent 107 in substantially flush relation to the side of the ratchet-wheel 24, whereby a rearward movement of the rod 113 will cause the finger 114 to engage the nose ends of said pawl and detent and move the same from engagement with the wheel teeth.

Fixed to the outer side of the pattern wheel or cam 26 in concentric relation to the wheel 24 is a bevel-gear 115 with which a drive pinion 116 meshes. The pinion 116 is carried by a shaft 117, which is journaled in suitable bearings 118 and 119 attached to the frame parts 1 and 2, respectively, and has its forward end provided with a handwheel 120 that is disposed in convenient reach of the operator. The purpose of this hand drive for the ratchet-wheel 24 is to enable such wheel to be turned backward or forward a predetermined distance to permit the refilling of one or more holes in a brush-back with bristle-tufts in case of improper feeding of bristle-tufts in the first instance. It is evident that when the rod 113 has been moved to release the pawl 97 and detent 107 from engagement with the ratchet-wheel 24, the hand driving mechanism can then be operated to move the wheel 24 to any desired position.

In the use of my machine the operator clamps a blank brush-back 20 to the carrying frame 10 at the rear of the drill 4, and also clamps a bored brush-back, which is designated 20ª, to the carrying frame 10 disposed at the rear of the filler nozzle 4, the back 20ª having been bored during a previous cycle of operations of the machine. This having been done, the operator depresses the foot-controlled rod 63 to force the clutch member 56 into engagement with the pulley 55 against the tension of the spring 65, the parts being held in such clutch engaging position by the catch-finger 68, which is moved into catch engagement with the pin 70 of the link 59 of the clutch shifting mechanism, the finger 68 being urged into the pin engaging position shown in Fig. 3 by the action of the spring 79 on the hand-controlled lever 72. At each complete rotation of the shaft 54, the rod 85, which forms a part of the connection between the lever 86 and crank-wheel 80, moves said lever to impart forward and backward strokes to the slide table 5, the length of the forward stroke of which is determined by the adjustment of the stop-screw 91. The rocking of the lever 86 also imparts a predetermined partial rotation to the ratchet-wheel 24, the length of which partial rotation is determined by the length of movement of the pawl 97, as the carrying parts for such pawl may be adjusted to cause the pawl to have a movement equal to the width of one tooth of the wheel or equal to the width of more than one tooth, as it may be desired to bore the holes in the blank 20 and to place the bristle-tufts in the back 20ª a greater or less distance apart. As the wheel 24 rotates, the brush-back carrying frames 10, 10 are automatically swung in vertical and horizontal directions to move the brush-backs in proper positions for the drilling of holes in one, and the filling of holes in the other, in properly spaced relation throughout the area of the backs, such movements of the frames being controlled by the cam or pattern-wheels 26 and 27 and connecting mechanisms. The vertical rocking of the brush-back carying frames is effected by the slide 28 bearing upward against the roll 30 on the arm 9 and resting on the cam-wheel 26, while the horizontal swinging movements of the frames 10 relative to the rocker-heads 8 are effected by axial movements of the shaft 39, which movements are determined by the formation of the cam-wheel 27 and communicated from such wheel to the shaft by the intermediate slide 32 and bell-crank lever 34. The loose thrust bearing contact of the rods 44 with the inner ends of the frames 10 at their respective outer sides causes a positive swinging of one or the other frame in one direction as the shaft 39 is axially shifted, while the spring connection between the inner end portions of the frames 10 and the adjacent ends of the shaft 39 causes the inner ends of the frames to be yieldingly held to the ends of the rods 44 and to follow such rods in their respective outward movements.

It will be understood that the movements which are imparted to the brush-backs are of a compound nature in that they combine both the horizontal and vertical swinging movements of the brush-back carrying means.

The depth of the boring and filling of the different holes in the brush-backs is kept uniform by the anvil or thrust parts 49—50 bearing against the respective cam surfaces of the frame plates 16, the springs 14 at all times urging said plates against such thrust parts. When the drilling of a predetermined number of holes in the brush-back 20 and the filling of similar holes in the brush-back 20ᵃ has been completed, the pin 78 on the ratchet-wheel 24 will have moved into engagement with the trip-arm 77 and moved such arm to effect a movement of the catch finger 68 from engagement with the pin 70, thus permitting a release of the clutch members 55 and 56 and effecting a consequent stopping of the machine. The machine can also be stopped at any desired intermediate point of a cycle of operations by a movement of the hand-control lever 72 to move the catch-finger 68 from engagement with the pin 70.

It will be noted that the ratchet-wheel 24 will remain at rest during a forward movement of the brush-back carrying parts, during each of which movements a drilling and a filling operation takes place, and that the movements of the rotating parts 24, 26 and 27 and the consequent shifting of the positions of the brush-backs to place them in respective positions for the next drilling and filling operation takes place during the rearward movements of the brush-back carrying parts. The locking of the ratchet-wheel 24 against rotation maintains the brush-back carrying parts rigid relative to the slide table 5 to insure an accurate positioning of the holes in the back 20 and an accurate registering of the hole in the back 20ᵃ, which is to be filled, with the filler nozzle.

It will be understood that the forms of the pattern wheels 26 and 27 may be changed to suit the arrangement and spacing of the holes in the brush-backs, as is well understood in the art, and that an adjusting of the screws 100 and 104 will change the length of throw of the pawl 97 at each rocking movement of the lever 86 and effect a consequent change in the spacing of the brush-back holes as the same are drilled and filled. It will also be understood that the invention is not limited to any specific construction or arrangement of the parts except in so far as such limitations are specified in the claims.

Having thus described my invention, what I claim as new, and desire to secure by Letters Patent, is—

1. In combination, a rocker-head, a work-holder carried by said head for rectilinear movements toward and away from the rocker-head axis, and means yieldingly urging said holder in one direction of its movement.

2. In combination, a rocker-head, a work-holder carried by said head for rectilinear movements relative thereto, and means yieldingly urging said holder in one direction of its movement.

3. In combination, a rocker-head, and a work-holder pivotally and slidingly carried by said head for swinging and rectilinear movements relative thereto.

4. In combination, a rocker-head, a work-holder pivotally and slidingly carried by said head for rocking and rectilinear movements relative thereto, the said rectilinear movements of the holder being toward and away from the rocking axis of the head.

5. In combination, a rocker head pivotally movable in one plane, a work-holder frame carried by said head for pivotal movements in a different plane from the plane of movement of said rocker-head, and mechanism operable to impart predetermined pivotal movements to said head and frame and to vary the relative positions of their axes of oscillation.

6. In combination, a work-holder, mechanism operable to rock said holder about different axes and to change the relative positions of the axes, and spring means urging a transverse movement of one axis relative to the other and coöperating with said mechanism to vary the distance between the axes of movement of said holder.

7. In combination, a rocker-head, a work-holder carried by said head, mechanism operable to impart predetermined rocking movements to said head and holder each about an axis which is disposed in an intersecting plane to the axis of the other and to impart predetermined movements to the work-holder relative to the rocker-head to vary the perpendicular distance between the axes of said head and holder.

8. In combination, work-holding means having a plurality of parts movable together about one axis, one of said parts being U-shape with its open end projecting transversely from its rocking axis and the other of said parts being pivotally carried by said U-shaped part between the arms thereof, and mechanism for imparting predetermined rocking movements to said parts.

9. In combination, work-holding means having a plurality of parts movable together about one axis and one carried for both pivotal and rectilinear sliding movements by the other, and mechanism for imparting predetermined movements to the respective parts.

10. In combination, means having a plurality of parts movable together about one axis and one pivotally and slidingly carried by the other part and forming a work-holder, spring means urging a movement of one part toward the other, and mechanism for imparting predetermined movements to said parts.

11. In combination, a U-shaped rocker-head, and a work-holder pivotally and slidingly carried by said head between the arms thereof.

12. In combination, a U-shaped rocker-head, a work-holder pivotally and slidingly carried by said head between the arms thereof, and spring means urging a relative sliding movement of said head and holder in one direction.

13. In combination, a U-shaped rocker-head having longitudinal guide-ways in its arms, members mounted for sliding movements in said ways, and a work-holder pivotally carried by said members.

14. In combination, a U-shaped rocker-head having longitudinally extending guide-ways in its arms, members guided for movements in said ways, a work-holder pivotally carried by said members for pivotal and sliding movements relative to said head, and spring means urging a sliding movement of the work-holder in one direction relative to said head.

15. In combination, a U-shaped rocker-head having longitudinally extending guide-ways in its arms, members movable in said ways, a work-holder carried by said members for pivotal and sliding movements relative to said head, and mechanism for imparting predetermined movements to said head and work-holder.

16. In combination, a rocker-member, a work-holding means movably carried by said member, and mechanism for moving said means relative to the rocker-member upon a rocking movement of said member to compensate for the varying lengths of radii between the rocking axis of said member and the surface of work carried by said means.

17. In combination, a rocker member, a work-holder movably carried by said member, and means for varying the distances between points on the work-carrying face of said holder and the rocking axis of said member.

18. In combination, a rocker-head, a work-holder slidingly carried by said head, and means for varying the distance between different points on the surface of work carried by said holder and the axis of said head upon a rocking of the head.

19. In combination, a rocker-head, a work-holder slidingly carried by said head and having a cam surface in opposition to its work-carrying face, means urging a movement of the holder in one direction relative to the head, and means coacting with said cam surface and coöperating with said first means to determine the relative movements of said holder and head upon a rocking of the head.

20. In combination, a work-holder, means carrying said work-holder for rocking movements and for sliding movements relative to the rocking axis of the work-holder, and means coacting with the work-holder to oppose thrusts thereon and to guide the relative movements of the holder and its carrying means.

21. In combination, a work-holder, rocking means slidingly carrying said holder for movements toward and away from its rocking axis, an abutment for said work-holder in opposition to the work-carrying face thereof, said abutment being fixed relative to the rocking axis of said means and coöperating with the surface of the holder with which it abuts to permit the holder to have predetermined sliding movements relative to the axis of said means when the means is rocked, and means yieldingly retaining said holder in contact with said abutment.

22. In combination, a vertically rocking member, a work carrying part carried by and movable toward and away from the swinging axis of said member, and means for permitting and causing said work carrying part to have predetermined movements toward and from the swinging axis of said member when the member is being swung.

23. In combination, a work-carrying means having a plurality of parts movable together about one axis and one pivotally and slidingly carried by the other, mechanism for imparting predetermined rocking movements to said parts, and means for controlling the relative sliding movements of said sliding part as said part is rocked.

24. In combination, a work-carrying means having a plurality of parts movable together about one axis and one pivotally and slidingly carried by the other part and having a cam surface in opposition to its work-carrying face, mechanism for imparting predetermined rocking movements to said parts, means yieldingly urging the part having said cam surface toward the axis of the other part, and means forming a firm abutment for and acting against said cam surface during the rocking movements of the parts to coöperate with said first means to cause the work-carrying surface of the holder to have predetermined movements toward and away from the axis of the other part.

25. In combination, a U-shaped rocking-head, a work-holding frame slidingly carried by said rocker-head between the arms thereof, and means for causing a sliding movement of said frame relative to the rocker-head as the latter is rocked.

26. In combination, a U-shaped rocker-head, a work-holding frame pivotally and slidingly carried by said head between the arms thereof, mechanism for imparting predetermined rocking movements to said head and frame, and means for causing the frame to have predetermined sliding movements toward and away from the rocking axis of the head as the head is rocked.

27. In combination, a U-shaped rocker-head, a work-holding frame pivotally and slidingly carried by said head between the arms thereof, said frame having the rear of its work-carrying side provided with a cam surface, mechanism for imparting predetermined rocking movements to said head and frame, and means having a part in coaction with said cam surface for permitting and causing the frame to have predetermined movements toward and away from the axis of said head when the head is rocked.

28. In combination, a reciprocatory member, a work-holder pivotally carried by said member, means for reciprocating said member, mechanism for imparting predetermined rocking movements to said work-holder, and means fixed to said member and forming an abutment for a part of said holder.

29. In combination, a slide, a rocker-head carried by said slide and having a projecting arm, and rocker-head operating means having a movable head actuating part in the path of sliding movements of said arm with the head and slide whereby said head during a predetermined portion of its movement with the slide has predetermined movements imparted thereto by said part.

30. In combination, a reciprocatory member, a work-holder carried by said member, means for moving said member, and mechanism operable to rock said holder about different axes and to change the relative positions of the axes, one of said axes being fixed relative to said member.

31. In combination, a reciprocatory member, a work-holder carried by said member and having two parts connected for relative pivotal and sliding movements, means for imparting predetermined movements to said member, mechanism for imparting predetermined rocking movements to the parts of said holder relative to said member, means urging a relative sliding movement of the holder parts in one direction, and a part fixed to said member and coacting with one of said holder parts in opposition to the work-carrying face thereof to cause and permit the work-carrying part to have predetermined sliding movements relative to the other holder part when the holder is rocked.

32. In combination, a sliding member, a rocker-head carried by said member, means for rocking said head when the member is in a predetermined portion of its movement, a work-holder carried by said head for rocking movements therewith and for movements relative thereto in a plane which intersects the plane of rocking movements of the head, and mechanism for imparting predetermined movements to said holder relative to the head and having a part which is axially shiftable in axial register with the rocking axis of said head.

33. In combination, a reciprocatory member, means for moving said member, a rocker-head carried by said member for vertical rocking movements relative thereto, a work-holder carried by said head for movements toward and away from the rocker-head axis, and means urging said holder in one direction relative to the head, and an abutment part fixedly carried by said member and coacting with the holder to coöperate with said urging means to control the movements of the holder relative to the head when the head is rocked.

34. In combination, a reciprocatory member, means for moving said member, a rocker-head carried by said member for vertical rocking movements relative thereto, means for rocking said head during a movement of said member, a work-holder pivotally and slidingly carried by said head and influenced to move toward the axis of the head, and means fixed relative to the axis of said head for forming a rigid abutment for said work-holder and coacting therewith to control its sliding movements relative to the head as the head is rocked.

35. In combination, a reciprocatory member, means for moving said member, a U-shaped rocker-head carried by said member for vertical rocking movements relative thereto, a work-holder frame carried for pivotal and sliding movements by said head between the arms thereof, said head having a cam surface on the back of its work-carrying side, mechanism for imparting predetermined rocking movements to said head and frame during a movement of said member, means urging the frame toward the axis of said head, and means fixed relative to the head axis and coacting with the cam surface of said frame to oppose thrusts against the work-carrying face of the frame and to coöperate with said cam surface and said urging means to impart predetermined sliding movements to the frame relative to the head.

36. In combination, work-carrying means having a work-holding part mounted for compound oscillatory movements, means for imparting rocking movements to said part in one plane, and means for imparting rocking movements to said part in another plane and having an axially shiftable member in axial register with one of the rocking axes of said part.

37. In combination, work-carrying means having a work-holding part mounted for compound oscillatory movements, a movable pattern member, and means actuated by a movement of said pattern member for imparting rocking movements to said part in one plane and having a longitudinally shiftable member coacting with said part.

38. In combination, work-carrying means having a work-holding part mounted for compound oscillatory movements, means for imparting rocking movements to said part in one plane, a pattern wheel, and means actuated by said wheel for imparting rocking movements in a different plane to said part and having a member coacting with said part and axially shiftable in axial register with one of the rocking axes of said part.

39. In combination, a pair of cam wheels rotatable in unison, a rocker-head, a work-holder pivotally and slidingly carried by said head, and separate means for imparting respective rocking movements to said head and holder from said wheels and for imparting predetermined sliding movements to the work-holder relative to the head.

40. In combination, a set of cam wheels rotatable in unison, a rocker-head, a work-holder pivotally and slidingly carried by said head, means connecting one of said wheels and the rocker-head for communicating predetermined rocking movements to the head from a rotation of the wheel, and means connecting another of said wheels to said work-holder for communicating predetermined rocking movements thereto relative to the head from a rotation of its cam wheel, said latter means permitting the work-holder to have sliding movements relative to the rocking movements thereof.

41. In combination, work-holding means having parts rocking about different axes and one part being slidable relative to the other, a rotatable element, and separate means actuated by said element for imparting predetermined rocking movements to the respective parts of the holding means and relative sliding movements thereto.

42. In combination, a rocker-head, a work-holder carried by said head for rocking movements relative thereto, a rotatable element, pattern wheels rotatable with said element, means connecting one wheel to the rocker-head for imparting predetermined rocking movements thereto, and means connecting the other wheel to the work-holder to impart predetermined rocking movements thereto relative to said head.

43. In combination, a rotatable element, means for imparting step by step rotary movements to said element, pattern wheels rotatable with said element, a rocker-head, a work-holder pivotally carried by said head, and separate means respectively communicating predetermined rocking movements to said head and holder from rotary movements of said wheels.

44. In combination, a slidingly mounted work-carrying means, a member movable at an angle to the plane of movement of said means and engaging a part of the means to impart rocking movements thereto when the member is reciprocated, and mechanism operable to impart predetermined reciprocatory movements to said member.

45. In combination, a pair of elements mounted for reciprocatory movements in intersecting planes, mechanism for imparting relative predetermined movements to said elements, and a work-holder pivotally carried by one element and having its rocking movements controlled by movements of the other element.

46. In combination, a table and a slide mounted for reciprocatory movements in intersecting planes, pattern wheel controlled mechanism for imparting relative predetermined movements to said table and slide, and a work-holder pivotally and slidingly carried by the table and having its rocking movements controlled by movements of the said slide.

47. In combination, a table and a slide mounted for reciprocatory movements in intersecting planes, mechanism for imparting relative predetermined movements to said table and slide, a rocker-head carried by the table, a work-holder pivotally carried by said rocker-head and having its rocking movements relative to the head controlled by the movements of said slide which does not carry the rocker-head.

48. In combination, a pair of elements mounted for reciprocatory movements in intersecting planes, mechanism for imparting relative predetermined movements to said elements, a work-holder pivotally carried by one of said elements, said holder having a part in sliding contact with said other element whereby movements of said latter element impart rocking movements to said work-holder.

49. In combination, a rocker-head mounted for reciprocatory movements, a work-holder pivotally carried by the rocker-head, a pair of reciprocatory elements movable in planes which intersect the plane of reciprocatory movements of the rocker-head, means communicating rocking movements to the rocker-head from reciprocating movements of one of said elements, and means communicating rocking movements to the work-holder relative to said head from reciprocatory movements of the other of said elements, and mechanism operable to impart predetermined relative reciprocatory movements to said element.

50. In combination, an oscillatory work-holder, a pattern wheel, a slide coacting with and having predetermined reciprocatory movements imparted thereto by a rotation of said wheel, a reciprocatory member, connection between said member and work-holder for imparting movements from one to the other, and means connecting said slide and member for communicating reciprocatory movements in intersecting planes from one to the other.

51. In combination, a rocker-head, a work-holder pivotally carried by said head for rocking movements relative thereto, an axially shiftable shaft disposed in axial relation to the rocking axis of said head, a thrust-rod carried by said shaft and having an end bearing against a portion of said work-holder, yielding draft connection between said work-holder and shaft, said connection and thrust-rod imparting rocking movements to said work-holder relative to the rocker-head when said shaft is axially shifted, and means for imparting predetermined shifting movements to said shaft.

52. In combination, a rocker-head, a work-holder pivotally carried by said head, an axially shiftable member in axial alinement with the rocking axis of said head and having a part in connection with said work-holder for communicating rocking movements thereto relative to the head when said member is shifted, and means for imparting predetermined shifting movements to said member.

53. In combination, a rocker-head, a work-holder pivotally carried by said head, means for rocking said head, and means for imparting rocking movements to said holder relative to the head and having an axially shiftable member in axial register with the rocking axis of said head.

54. In combination, a rocker-head, a work-holder pivotally carried by said head, means for rocking the head, a movable pattern member, and means actuated by movements of said member for imparting rocking movements to said holder relative to the rocker-head and having an axially shiftable member in axial register with the rocking axis of said head.

55. In combination, a rocker-head, a work-holder pivotally carried by said head, a rotatable element, means for communicating predetermined rocking movements to said head from a rotation of said element, means for communicating predetermined rocking movements to said work-holder relative to the head from a rotation of said element, means for driving said element, and mechanism automatically operable to stop the driving action of the element when it has rotated a predetermined extent.

56. In combination, a rocker-head, a work-holder pivotally carried by said head, mechanism imparting relative rocking movements to both said head and work-holder, and means automatically operable to stop the action of said mechanism when predetermined movements have been communicated to said head and holder.

57. In combination, an oscillatory work-holder, means for imparting predetermined oscillatory movements to said work-holder, mechanism for imparting intermittent movements to said means, and means automatically operable to lock said first means against movement during a rest period thereof.

58. In combination, a table, a work-holder carried for rocking movements by said table, a pattern wheel, means for communicating predetermined rocking movements to said work-holder from a rotation of said wheel, and mechanism operable to impart step by step rotation to said wheel and predetermined reciprocatory movements to said table.

59. In combination, a reciprocatory table, a work-holder pivotally carried by said table, a pattern wheel, means for communicating predetermined rocking movements to said holder from a rotation of said wheel, a lever, separate connections from said lever to said table and wheel for communicating respective movements thereto from a rocking of the lever, and means for rocking the lever.

60. In combination, a set of work-holding means each having a plurality of parts movable together about one axis and one part pivotally and slidingly carried by the other, and mechanism for imparting predetermined movements in unison to the parts of the several work-holding means.

61. In combination, a set of work-holding means each having a plurality of parts movable together about one axis and one part pivotally and slidingly carried by the other, mechanism for imparting predetermined rocking movements in unison to the parts of the several work-holding means, and mechanism for imparting predetermined relative sliding movements in unison to the parts of the several work-holding means.

62. In combination, a plurality of rocker-heads, a work-holder slidingly carried by each rocker-head, and means coacting with the work-holders to communicate predetermined sliding movements in unison thereto relative to the respective rocker-heads as the heads are rocked.

63. In combination, a slide, a shaft carried by said slide, a pair of rocker-heads carried by said shaft, a work-holder pivotally carried by each rocker-head, and mechanism operable to impart predetermined movements to said rocker-heads and work-holders during movements of said slide.

64. In combination, a slide member, a shaft carried by said slide, rocker-heads carried by said shaft, work-holders slidingly carried by said heads, means for rocking said shaft, means urging each work-holder in one direction relative to its carrying-head, separate parts fixedly projecting from said slide member and coacting with said work-holders to provide firm abutments therefor and to control the sliding movements of the holders relative to the carrying heads.

65. In combination, a hollow shaft, a plurality of rocker-heads carried by said shaft, a work-holder pivotally carried by each head, a second shaft mounted in and axially shiftable relative to said first shaft, separate connections between said second shaft and the respective work-holders to impart pivotal movements to the work-holders relative to the respective carrying heads when said second shaft is axially moved, and means for imparting predetermined axial movements to said second shaft.

66. In combination, a slide, a pair of rotatable pattern wheels, a shaft carried for rocking movements by said slide, a plurality of rocker-heads fixed to said shaft, a work-holder pivotally carried by each rocker-head, a reciprocatory member axially disposed with relation to said shaft and capable of rocking movements therewith and of axial shifting movements relative thereto, means connecting said member to said work-holders for communicating predetermined pivotal movements to said holders from axial shifting movements of said member, means connecting one of said pattern wheels and said member for communicating predetermined shifting movements to the latter, and means connecting the other of said pattern wheels and said shaft for communicating rocking movements to the shaft from a rotary movement of such wheel.

In testimony whereof, I have hereunto signed my name to this specification in the presence of two subscribing witnesses.

CONRAD JOBST.

Witnesses:
J. GAZZAM MACKENZIE,
C. W. OWEN.